WHITE & WENTWORTH.
Fruit Drier.
No. 102,742. Patented May 3, 1870.
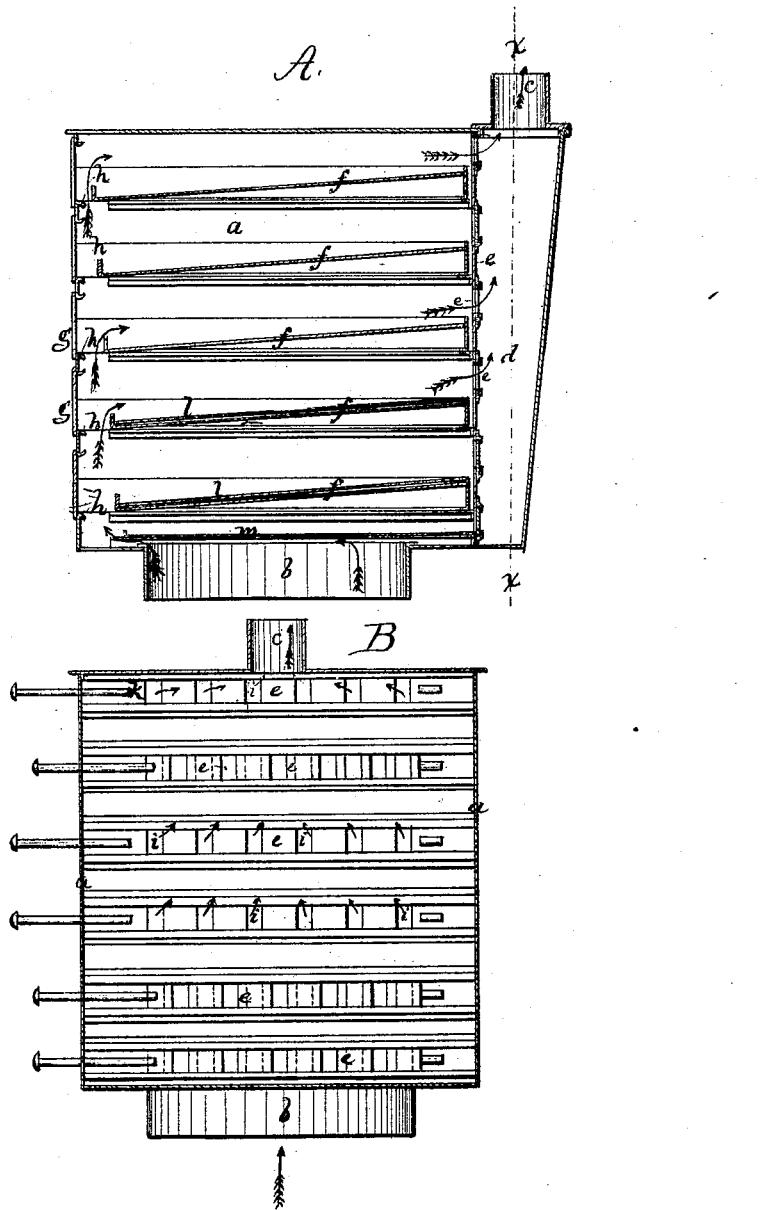

United States Patent Office.

GEORGE W. WHITE, OF MALDEN, AND LEWIS E. WENTWORTH, OF MELROSE, MASSACHUSETTS.

Letters Patent No. 102,742, dated May 3, 1870.

DRIER.

The Schedule referred to in these Letters Patent and making part of the same.

*To all whom it may concern:*

Be it known that we, GEORGE W. WHITE, of Malden, and LEWIS E. WENTWORTH, of Melrose, all in the county of Middlesex and State of Massachusetts, have invented an Improved Drying Apparatus; and we do hereby declare that the following, taken in connection with the drawings which accompany and form part of this specification, is a description of our invention sufficient to enable those skilled in the art to practice it.

Our invention relates to the construction and organization of an apparatus for drying grain, fruits, vegetables, and other substances, to be deprived of moisture, placed in drawers, compartments, or upon trays arranged in tiers, and inclosed in a chamber which connects at its lower part with a source of hot-air supply, and has leading from it a suitable air-conductor, the inlet supplying the heat, and the inlet and outlet establishing a circulation through the compartments or over the trays or drawers in the chamber, heating the trays, drawers, or compartments, and drying the grain or other substances contained therein, and conducting off the saturated air.

Our invention consists, primarily, in combining, with a series of close-bottomed compartments, drawers, or trays, arranged in a tier in a hot-air chamber, the chamber having a vertical hot-air space or flue in front or at one side of the trays, drawers, or compartments, and opposite said space a similar space or flue, at the side or rear of the trays, a series of sliding dampers or valves, one damper or set of dampers for each tray, drawer, or compartment, arranged in a partition between the trays, drawers, or compartments, and the take-up air-flue or space, the partition having openings controlled by the dampers, and the hot air being drawn horizontally through the trays, drawers, or compartments, or passing vertically by their front ends, in accordance with the open or closed position of the respective dampers at the rear of them.

The drawing represents an apparatus embodying our improvements.

A shows a vertical longitudinal and central section of the apparatus.

B a cross-section on the line $x\,x$, looking toward the trays.

*a* denotes a main hot-air chamber.

*b*, the hot-air pipe leading into the lower part thereof, this pipe conveying hot air from any suitable source of heat and air supply.

*c* is the exit pipe placed at the rear and top of the chamber, and leading into a suitable flue, this pipe leading from a narrow vertical chamber, *d*, divided off from the rear of the chamber *a* by a vertical partition, *e*.

In the main chamber *a* are the trays or compartments *f*, arranged in a vertical tier, as seen at A, and to slide out and in like drawers, or may be permanent compartments, the bottom of each tray or compartment extending not quite to the front piece *g*, leaving an opening, *h*, the series of openings making a free vertical hot-air space, extending up in front of all the trays, as seen at A.

The substances to be dried are placed upon or in any one or more of the trays or compartments, the space between each two constituting a horizontal drying-chamber or compartment, and to drive or draw the hot air through, and only through such compartments as may be filled with the substances to be dried, we interpose between the compartments and the flue or flue-space, at the rear of the chamber, the partition *e*, in which partition we make a series of air-passages, *i*, just above each tray, and for each series of passages *i* we provide a long damper, *k*, operated by a suitable rod or handle extending through one wall of the chamber, by sliding which damper the passages may be opened or closed, or more or less closed.

When the compartments are all filled, all the dampers are opened, the dampers of the upper trays being preferably less open than those of the lower trays, in order to establish a uniform circulation of the hot air through all the compartments, from the hot-air space *h* to the flue-chamber *d*. But, if only part of the compartments are filled, we open the dampers leading from the space or spaces above the compartment or compartments so filled, thereby causing all the hot air to traverse through and only through such spaces or compartments, the air and the moisture liberated from the drying substances escaping, through the openings *i*, into the chamber *d*, and thence into the flue *c*.

The bottom of each compartment may be inclined, as seen at A, or may be horizontal, and each or any of them may be provided with a netting or rack, *l*, for holding the substances to be dried out of contact with the bottom.

Immediately over the hot-air pipe *b* we place a deflector-plate, *m*, which plate may, however, be a tray, with the space above it provided with its openings *i* and damper *k*, this plate deflecting the hot air to the vertical space at the front of the compartments.

As the hot air for all the trays or drying compartments has to pass in front of the lower one, and only the hot air for the upper one has to pass in front of it, we graduate the width of opening from the bottom to the top, as seen at A, and as the exhausted air from all of the trays or horizontal drying compartments has to pass through the top of the rear flue-chamber *d*, and only the air from the bottom compartment passes through the lower part thereof, we make said flue-chamber narrow at bottom and to widen gradually to the flue c, as shown at A.

By this construction of a drying apparatus we are enabled to very rapidly dry fruit and other substances, sending the hot air through each or through any one or more of the compartments, and discharging it directly into the waste-flue, instead of carrying the moistened or saturated air from tray to tray or from compartment to compartment, as in ordinary drying apparatus.

We claim, in a drying apparatus connected with a furnace or source of hot-air supply, a series of close-bottomed drawers or trays, through any one or more of which currents of hot air may be established or cut off, by a system of dampers arranged substantially as described.

Executed, Boston, January 13, 1870.

GEO. W. WHITE.
LEWIS E. WENTWORTH.

Witnesses:
J. B. CROSBY,
FRANCIS GOULD.